US008208173B2

(12) United States Patent
Hinaga

(10) Patent No.: US 8,208,173 B2
(45) Date of Patent: Jun. 26, 2012

(54) IMAGE FORMING APPARATUS, IMAGE READING APPARATUS, AND CONTROL METHOD THEREOF

(75) Inventor: Keiichi Hinaga, Susono (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 13/234,032

(22) Filed: Sep. 15, 2011

(65) Prior Publication Data

US 2012/0002235 A1 Jan. 5, 2012

Related U.S. Application Data

(63) Continuation of application No. 12/951,476, filed on Nov. 22, 2010, now Pat. No. 8,040,564, which is a continuation of application No. 11/942,057, filed on Nov. 19, 2007, now Pat. No. 7,864,368.

(51) Int. Cl.
*G06K 15/02* (2006.01)

(52) U.S. Cl. ........................................ 358/1.9

(58) Field of Classification Search ........... 358/1.9; 707/200, 530, 102
See application file for complete search history.

(56) References Cited

U.S. PATENT DOCUMENTS

| 5,907,848 A | 5/1999 | Zaiken et al. |
| 6,898,317 B2 | 5/2005 | Struble et al. |
| 2002/0078069 A1* | 6/2002 | Moore ........................... 707/200 |
| 2005/0228683 A1 | 10/2005 | Saylor et al. |
| 2006/0053148 A1* | 3/2006 | Tamai et al. ................. 707/102 |

FOREIGN PATENT DOCUMENTS

| JP | 2004-199428 | 7/2004 |
| JP | 2004-200779 | 7/2004 |

OTHER PUBLICATIONS

U.S. Office Action mailed Sep. 23, 2009 corresponding to U.S. Appl. No. 11/942,057, filed Nov. 19, 2007.
U.S. Office Action mailed Apr. 9, 2010 corresponding to U.S. Appl. No. 11/942,057, filed Nov. 19, 2007.
U.S. Office Action mailed Feb. 18, 2011 corresponding to U.S. Appl. No. 12/951,476, filed Nov. 22, 2010.

* cited by examiner

*Primary Examiner* — Charlotte M Baker
(74) *Attorney, Agent, or Firm* — Turocy & Watson, LLP

(57) ABSTRACT

An image forming apparatus of the invention includes a read unit to read an original document, a storage unit to store an image file of the original document read by the read unit, a control unit to control storage and readout of the image file into and from the storage unit, and an image formation unit to print the image file read from the storage unit, and the control unit creates a template including one or plural elements, automatically creates an image file name based on the template when the image file is stored in the storage unit, and stores the image file. According to the image forming apparatus of the invention, when a file is stored, an operation burden is low and an easily identified file name can be created.

20 Claims, 17 Drawing Sheets

STORAGE SEQUENCE INTO USER-SPECIFIC STORAGE AREA

FIG. 4D

PASSWORD ◆PLEASE INPUT PASSWORD
(FIVE-DIGIT)

BOX NUMBER : 002
BOX NAME : TEST02
PASSWORD :

[CANCEL] [SETTING]

→ DEPRESSION OF "SETTING" BUTTON AFTER INPUT OF PASSWORD

FIG. 4E

STORAGE INTO BOX ◆PLEASE SELECT STORAGE DESTINATION OF DOCUMENT

| DOCUMENT/FOLDER NAME | TIME | SHEET | NUMBER OF PAGES |
|---|---|---|---|

1/1

[OPEN FOLDER] [CANCEL] [SETTING]

→ DEPRESSION OF "SETTING" BUTTON AFTER CONFIRMATION OF STORED DOCUMENT IN BOX

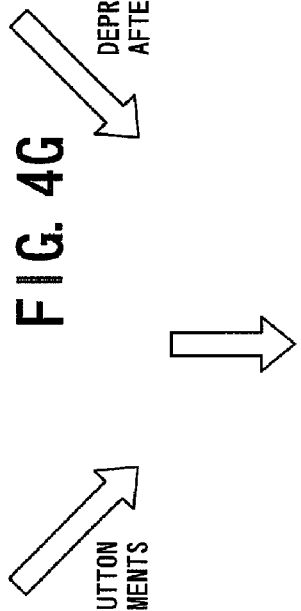

STORAGE SEQUENCE INTO USER-SPECIFIC STORAGE AREA

CASE WHERE USE OF SAME TEMPLATE IS THE FIRST TIME

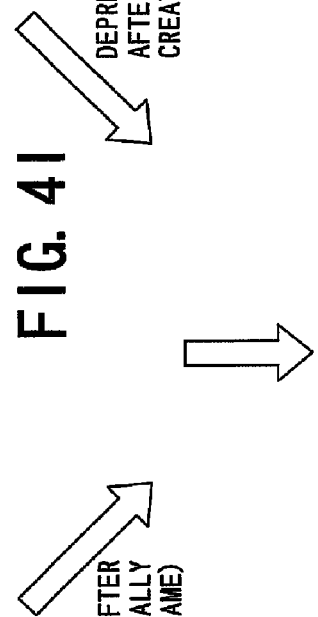

FIG. 4H

DEPRESSION OF "SETTING" BUTTON AFTER CONFIRMATION OF AUTOMATICALLY CREATED DOCUMENT NAME (FILE NAME)

CASE WHERE USE OF SAME TEMPLATE IS THE SECOND TIME OR LATER (SEQUENCE NUMBER "0002" IS AUTOMATICALLY ADDED)

FIG. 4I

DEPRESSION OF "SETTING" BUTTON AFTER CONFIRMATION OF AUTOMATICALLY CREATED DOCUMENT NAME (FILE NAME)

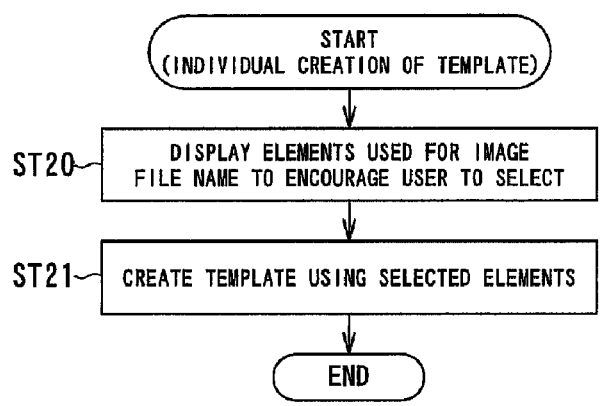
FIG. 5A
FIG. 5B
FIG. 5C
FIG. 6

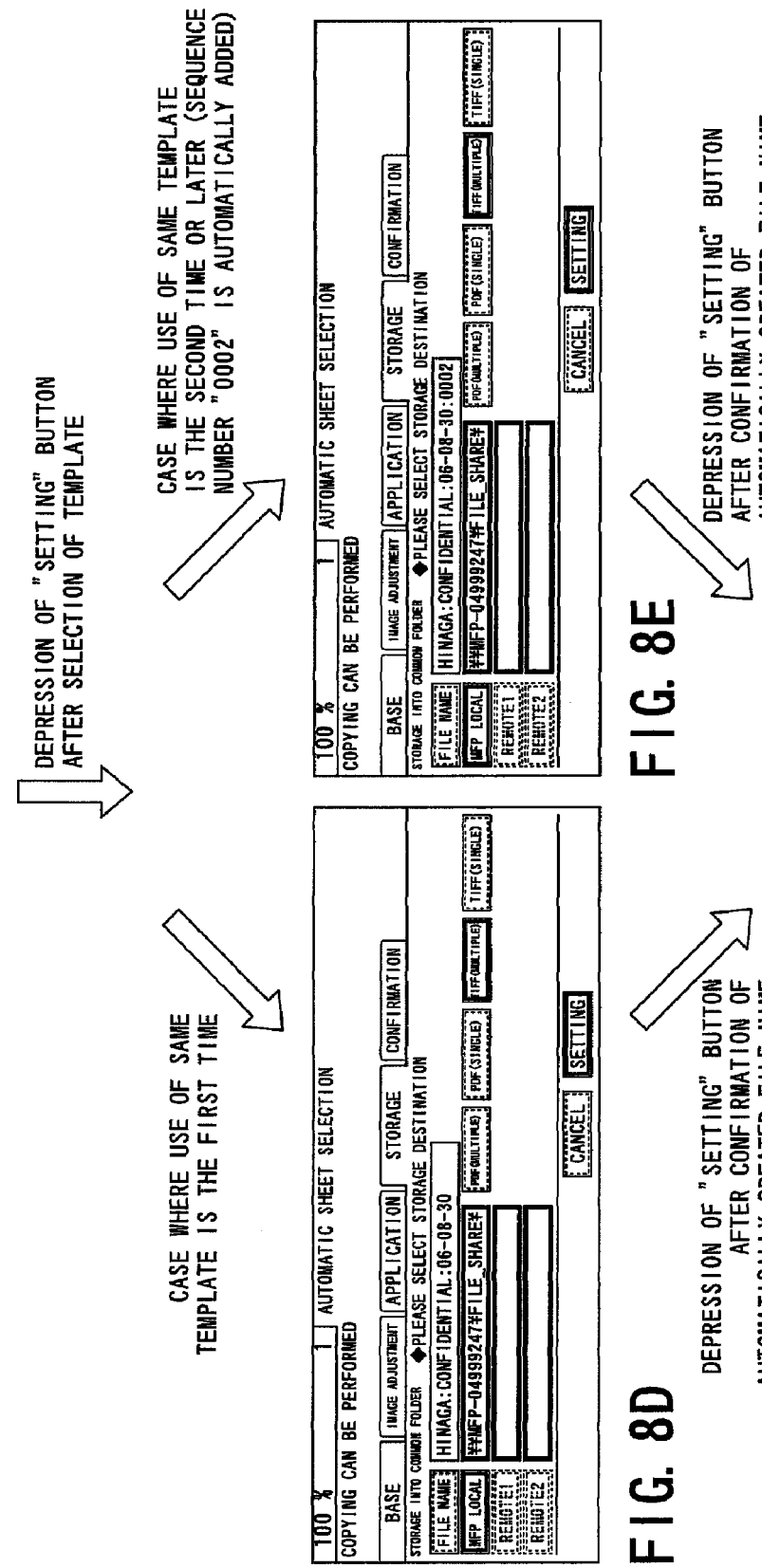

DEPRESSION OF "START" KEY

1

IMAGE FORMING APPARATUS, IMAGE READING APPARATUS, AND CONTROL METHOD THEREOF

CROSS-REFERENCE TO RELATED APPLICATIONS

This application is a Continuation of application Ser. No. 12/951,476 filed on Nov. 22, 2010, which is a Continuation of application Ser. No. 11/942,057 filed on Nov. 19, 2007, the entire contents of both of which are incorporated herein by reference.

BACKGROUND OF THE INVENTION

1. Field of the Invention

The present invention relates to an image forming apparatus, an image reading apparatus and a control method thereof, and particularly to an image forming apparatus having a file storage function, an image reading apparatus and a control method thereof.

2. Related Art

Recently, an image forming apparatus such as a digital compound machine (Multi-Function Peripheral) or an image reading apparatus such as a scanner apparatus is often constructed such that a large capacity storage apparatus such as, for example, an HDD (Hard Disk Drive) is incorporated and an image file of a read original document can be stored in this storage apparatus.

The image file stored in the HDD or the like is read from the HDD or the like and can be printed as required, or can be captured in an information processing apparatus such as a personal computer (PC).

In order to access a specific image file stored in the HDD or the like, the image file is required to be stored after certain identification information, for example, a specific file name is attached thereto at the time of storage.

In the related art image forming apparatus or image reading apparatus, two methods are generally adopted as methods of creating file names in the case where a storage operation to the HDD or the like is performed. One of them is a method of automatically creating a file name, and at the time of storage of a file, the file name is automatically created based on a date and a sequence number.

The other method is a method of storage in which a user attaches the file name individually, that is, the method in which the user inputs characters from an operation panel or the like to set an arbitrary file name at each time of storage.

In the method of automatically creating the file name, although the operation burden at the time of storage is low, in the case where an access is made after the storage, it is hard to find the file name that was automatically created based on the date and the sequence number. Especially, in an environment in which many users store many original documents, since the number of files stored in the HDD or the like becomes enormous, it becomes difficult to identify the file names, and there occurs a case where it takes much time to access a desired file.

On the other hand, in the method in which the user sets the file name individually, although accessibility to files is high since identification becomes easy by the file name, it is necessary to input the file name at each time of storage of the file, which requires much labor.

SUMMARY OF THE INVENTION

The present invention has been made in view of the above circumstances, and has an object to provide an image forming apparatus, an image reading apparatus and a control method thereof, in which when a file is stored, an operation burden is low and an easily identified file name can be automatically created.

In order to achieve the above object, according to an aspect of the invention, an image reading apparatus includes a read unit configured to read an original document, a storage unit configured to store an image file of the original document read by the read unit, and a control unit configured to control storage and readout of the image file into and from the storage unit, and the control unit creates a template including one or plural elements, automatically creates an image file name based on the template when the image file is stored in the storage unit, and stores the image file.

Besides, in order to achieve the above object, according to another aspect of the invention, an image forming apparatus includes a read unit configured to read an original document, a storage unit configured to store an image file of the original document read by the read unit, a control unit configured to control storage and readout of the image file into and from the storage unit, and an image formation unit configured to print the image file read from the storage unit, and the control unit creates a template including one or plural elements, automatically creates an image file name based on the template when the image file is stored in the storage unit, and stores the image file.

Besides, in order to achieve the above object, according to another aspect of the invention, a control method of an image reading apparatus includes the steps of reading an original document, storing an image file of the read original document into a storage unit, and controlling storage and readout of the image file into and from the storage unit, and at the controlling step, a template including one or plural elements is created, an image file name is automatically created based on the template when the image file is stored in the storage unit, and the image file is stored.

BRIEF DESCRIPTION OF THE DRAWINGS

In the accompanying drawings:

FIGS. 4A to 4L are views showing display examples of an operation display panel at the time when an image data file is stored in the user-specific storage area of the storage unit and transition states thereof;

FIGS. 5A to 5C are views for explaining a correspondence relation among a screen to select an element of a file name, a template and a file name;

FIG. 6 is a flowchart showing a process example in the case where a template is independently created;

FIGS. 8A to 8G are views showing display examples of an operation display panel at the time when an image data file is stored in the common storage area of the storage unit and transition states thereof.

DETAILED DESCRIPTION OF THE PREFERRED EMBODIMENTS

An embodiment of an image forming apparatus, an image reading apparatus and a control method thereof according to the invention will be described with reference to the accompanying drawings.

(1) Structure of Image Forming Apparatus and Image Reading Apparatus

Figure 1:
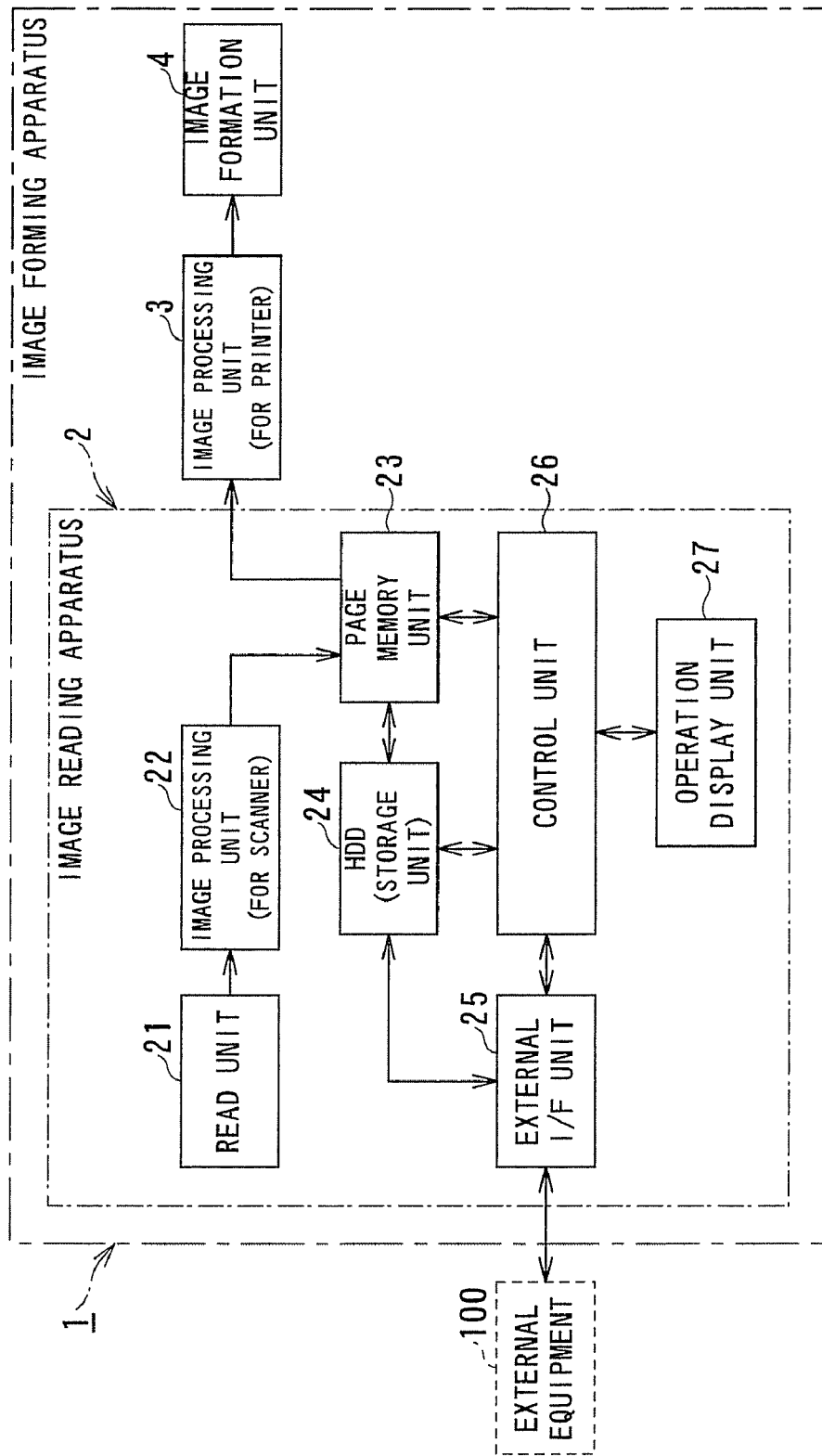
FIG. 1 is a view showing a structural example of an image forming apparatus and an image reading apparatus according to an embodiment of the invention.

FIG. 1 is a view showing a system structural example of an image forming apparatus 1 and an image reading apparatus 2 according to an embodiment.

The image forming apparatus 1 is, for example, an apparatus called a digital MFP (Multi-Function Peripheral) having plural functions such as a copy function, a printer function, a scanner function and a fax function.

The image forming apparatus 1 includes the image reading apparatus 2 to mainly realize the scanner function, an image processing unit (for printer) 3 to perform various image processings, such as color conversion processing and gradation processing, on image data generated by the image reading apparatus 2, and an image formation unit 4 to perform printing by an electrophotographic system.

The image reading apparatus 2 includes a read unit 21, an image processing unit (for scanner) 22, a page memory unit 23, an HDD (a storage unit) 24, an external I/F unit 25, a control unit 26, an operation display unit 27 and the like.

The read unit 21 optically reads an original document by a CCD sensor or the like and generates image data.

The generated image data is subjected to scanner image processing, such as shading correction to correct the irregularity of a light source in a main scanning direction and the irregularity of sensitivity of a CCD sensor, by the image processing unit (for scanner) 22.

The image data subjected to the image processing is temporarily stored in the page memory unit 23 in page units, and then is outputted to the image processing unit (for printer) 3.

On the other hand, the image data stored in the page memory unit 23 can be stored in a large capacity nonvolatile storage device, for example, the HDD 24 as required. When the image data is stored in the HDD 24, it is necessary to attach a file name to the image data and to store it, and this point is an important point of this embodiment, and its operation will be described later in detail.

The file of the image data stored in the HDD 24 can be outputted to an external equipment 100, for example, a personal computer through the external I/F unit 25.

The control unit 26 includes a processor and the like, and controls the whole image forming apparatus 1 (or the image reading apparatus 2), and further controls storage and readout into and from the HDD 24.

The operation display unit 27 functions as a user interface, and includes various input keys, a display panel, a touch panel and the like.

(2) Operation

Among operations of the image forming apparatus 1 and the image reading apparatus 2 constructed as described above, especially an operation of storage control of an image data file into the HDD 24 will be described below.

The storage of the image data file accompanies the user's operation. Accordingly, the operation display unit 27 as the user interface will be first described in brief.

Figure 2:
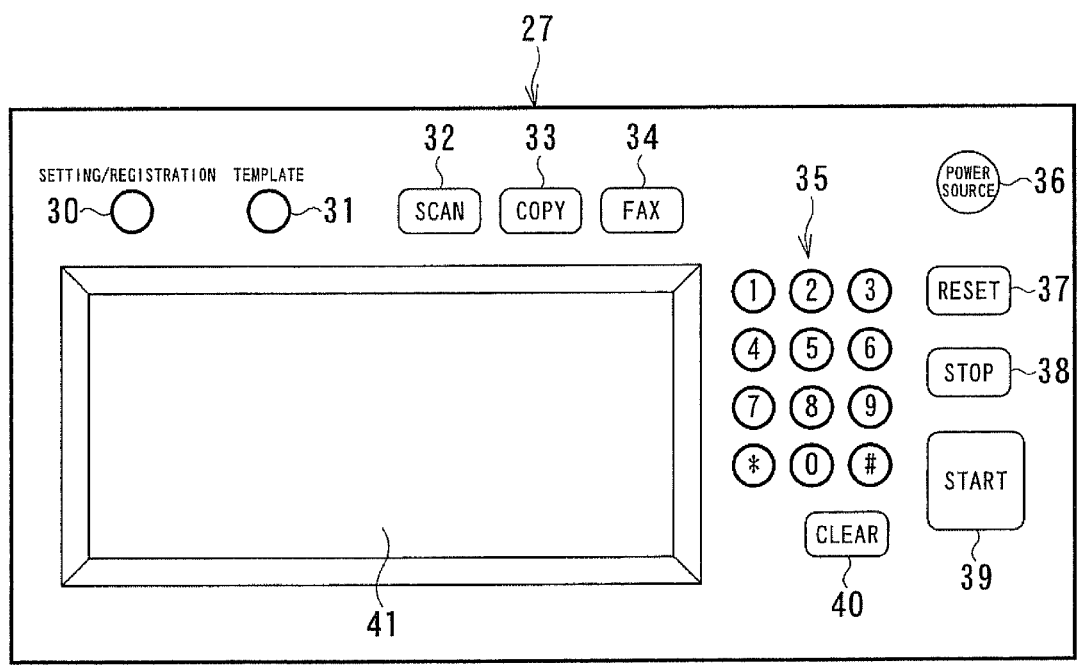
FIG. 2 is a view showing an outer appearance example of an operation display unit of the image forming apparatus and the image reading apparatus according to the embodiment of the invention.

FIG. 2 is a view showing an example of the outer appearance of the operation display unit 27. The operation display unit 27 includes an operation display panel 41 at the center, and plural input keys are arranged on its periphery. The operation display panel 41 is constructed by stacking, for example, a touch panel and a liquid crystal display panel.

The input keys include a "setting/registration" key 30 to set and register various data, a "template" key 31 to create a template, a "scan key" 32 to cause the image forming apparatus 1 to function as a scanner, a "copy" key 33 to cause it to function as a copying machine, and a "fax" key 34 to cause it to function as a fax.

In addition, a numeric keypad 35, a "power source" key 36, a "reset" key 37, a "stop" key 38, a "start" key 39, a "clear" key 40 and the like are included.

Next, the storage operation of the image data file will be described.

The HDD 24 for storing the image data file generally includes a user-specific storage area and a common storage area.

The user-specific storage area is, for example, an area called a user box, and the storage area can be assigned to each user. Each user can store his/her own managed image data file in the assigned user box. Besides, a password can be set for the user box, and the confidentiality can be ensured.

Plural users can store image data files in the common storage area, and a general image data file requiring less confidentiality or an image data file used in common by plural users is stored.

At the time of storage of the image data file into the HDD 24, since operations are slightly different between the storage into the user-specific storage area and the storage into the common storage area, they will be separately described.

(3) Storage Into the User-Specific Storage Area

Figure 3:
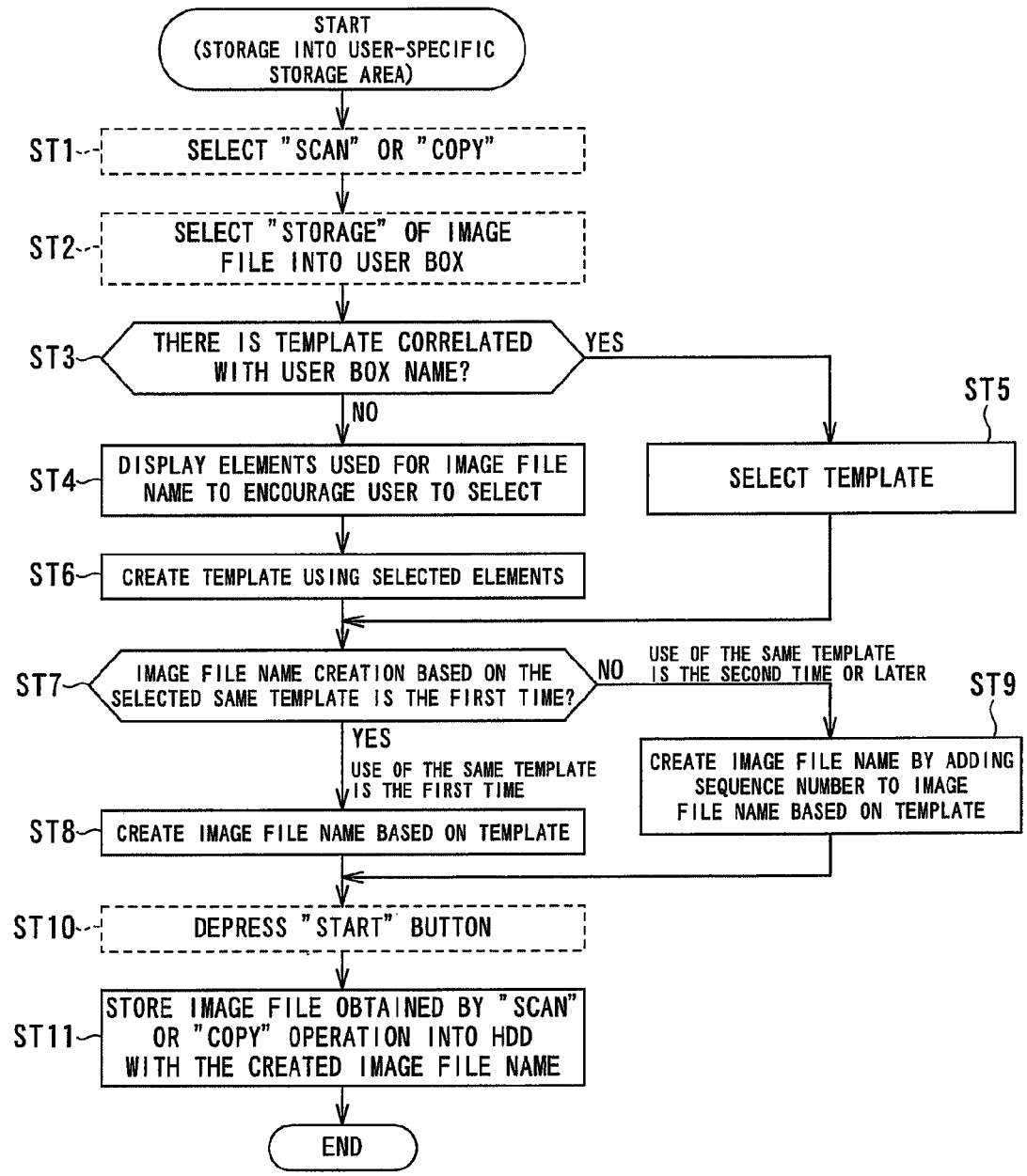
FIG. 3 is a flowchart showing an example of a process at the time when an image data file is stored in a user-specific storage area of a storage unit.

FIG. 3 is a flowchart showing an example of a storage control operation of an image data file into the user-specific storage area of the HDD 24. In FIG. 3, a user's operation is indicated by a box of a broken line, and the other portion indicates a process by the control unit 26.

FIGS. 4A to 4L are views showing display examples of the operation display panel 41 of the operation display unit 27 making a transition along the flow of FIG. 3.

First, at step ST1 of FIG. 3, selection of a scan function or a copy function is performed by the user. This selection is performed by depressing the "scan" key 32 of the operation display unit 27 or the "copy" key 33.

In the case where the scan function is selected, an image data file generated by reading an original document is stored in the HDD 24. Thereafter, it is outputted to the external equipment 100 such as the personal computer as required. Besides, the stored image data file is read when necessary and can be repeatedly printed by the image formation unit 4.

On the other hand, in the case where the copy function is selected, the image data file of the original document is stored in the HDD 24, and is simultaneously printed by the image formation unit 4.

The storage operation into the HDD 24 does not basically vary between the case where the scan function is selected and the case where the copy function is selected. Then, in the following, a description will be made on the assumption that the copy function is selected at step ST1.

Figure 4A:
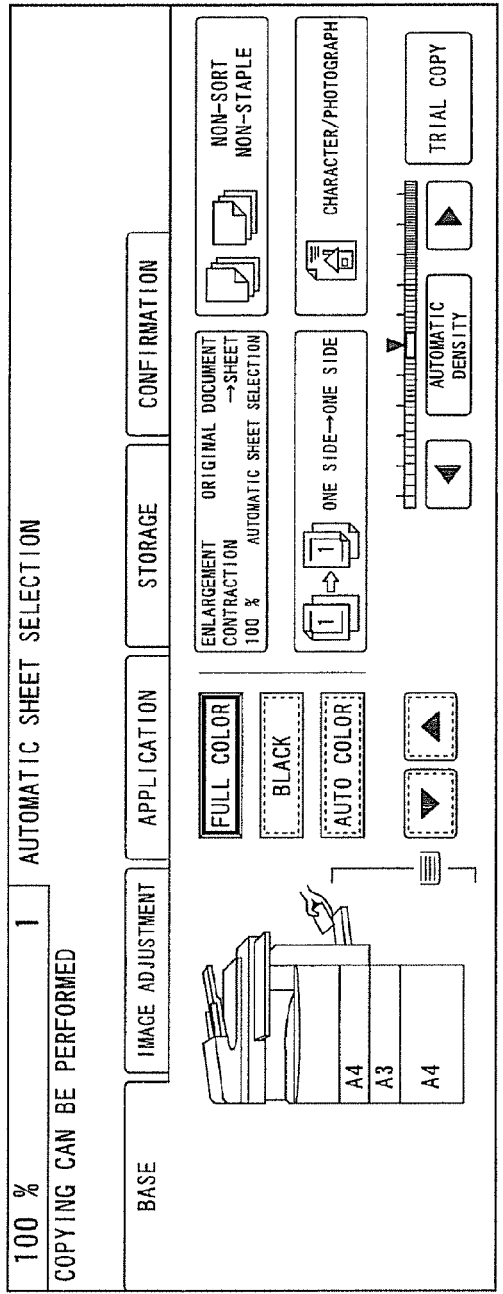

FIG. 4A shows a display example of the operation display panel 41 at the time when the copy function is selected. Here, in the case where the image data file is stored in the HDD 24 at the same time as copying, a "storage" tag displayed on the upper part of the operation display panel 41 is depressed.

Figure 4B:
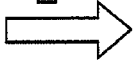

When the "storage" tag is depressed, the display of the operation display panel 41 makes a transition to FIG. 4B.

Figure 4C:
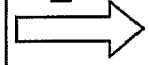

Further, when a "storage into filing box" button is depressed, a change is made to the display of FIG. 4C.

The filing box includes a "common box" as a common storage area and a user box as a user-specific storage area. In the example of FIG. 4C, two user boxes of names of "TEST01" and "TEST02" are previously provided as the user box.

For example, when the touch panel at the position of "TEST02" is depressed by the user, the user box "TEST02" is selected. By the operation up to now, the storage of the image file into the user box is selected (step ST2 of FIG. 3).

When "TEST02" is selected, a transition is made to the display of FIG. 4D, and the screen to encourage password input for authentication of the user is displayed. After the password is inputted, when a "setting" button is depressed, a transition is made to the display screen of FIG. 4E.

In the case where an image data file has already been stored in the user box "TEST02", the storage date of the image data file, together with the file name, is displayed, however, in the case where nothing is stored, as exemplified in FIG. 4E, it is blank. After confirming the display content, the user depresses the "setting" button.

Here, it is determined whether a template (template for file name creation) correlated with the user box name already exists or not (step ST3 of FIG. 3).

In the case where there is no template, elements used for the file name are displayed to encourage the user to select them (step ST4). Specifically, a screen exemplified in FIG. 4F is displayed, which notifies the user that a template for file name creation is newly created, and encourages the user to select elements of the template as the base of the file name.

On the other hand, in the case where the template already exits, as exemplified in FIG. 4G, the existing templates are displayed, and a desired template is selected by the user from them (step ST5).

FIG. 5A to FIG. 5C are views showing an example of a correspondence relation among a display screen of the operation display panel 41, a template and a file name.

FIG. 5A is the same view as FIG. 4F, and selectable elements of the template are displayed. The elements of the template include a user name, a category name, a date of year, month and day, a time and the like. The selection of the element is performed by, for example, depression of a check box, and a check mark "✓" is displayed in the check box of the selected element.

In the case where the user name and the category name are selected, an arbitrary character string is further inputted in the text box. As the user name, for example, the name of the user himself/herself is inputted to facilitate identification of the file name. In this example, the user name of "HINAGA" is inputted. Besides, the category name is an arbitrary classification name to further facilitate the identification of the file, and the kind of the document, the level of confidentiality or the like is inputted. In this example, as the level of confidentiality, the category name of "CONFIDENTIAL" is inputted.

In the case where the date of year, month and day and the time are selected as the elements of the template, the actual date of year, month and day and the time when the image data file is stored is included as a part of the file name.

In this example, the user name, the category name, and the date of year, month and day are selected as the elements of the template, and in accordance with this, the template exemplified in FIG. 5B is created.

When the image data file is stored in the HDD 24, the file name is automatically created based on this template, and is stored in the HDD 24. FIG. 5C shows an example of the file name created based on the template of FIG. 5B. In this example, the image data file is stored on Aug. 30, 2006, and in this case, as the file name, for example, "HINAGA: CONFIDENTIAL: 06-08-30" is created.

When the template for the file name creation is created (step ST6), next, it is determined whether the file name creation based on the created or selected template is the first time or not (step ST7). This is because it is conceivable that plural storages are performed using the same template.

In the case where the file name creation using the same template is the first time, the file name is created based on the template (step SST8, FIG. 4H).

On the other hand, in the case where the file name creation using the same template is the second time or later, a sequence number is further added to the above file name. For example, in the case where the second image data file is stored with respect to the same template, the file name of "HINAGA: CONFIDENTIAL: 06-08-30:0002" is automatically created (step ST9, FIG. 4I).

In the case where the third image data file is stored, the file name of "HINAGA: CONFIDENTIAL: 06-08-30:0003" is automatically created.

Figure 4J:
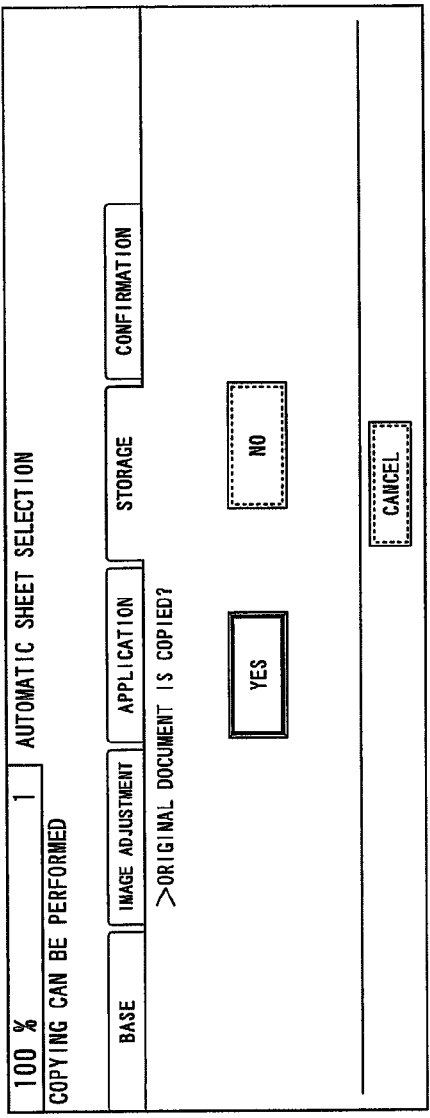
Figure 4K:
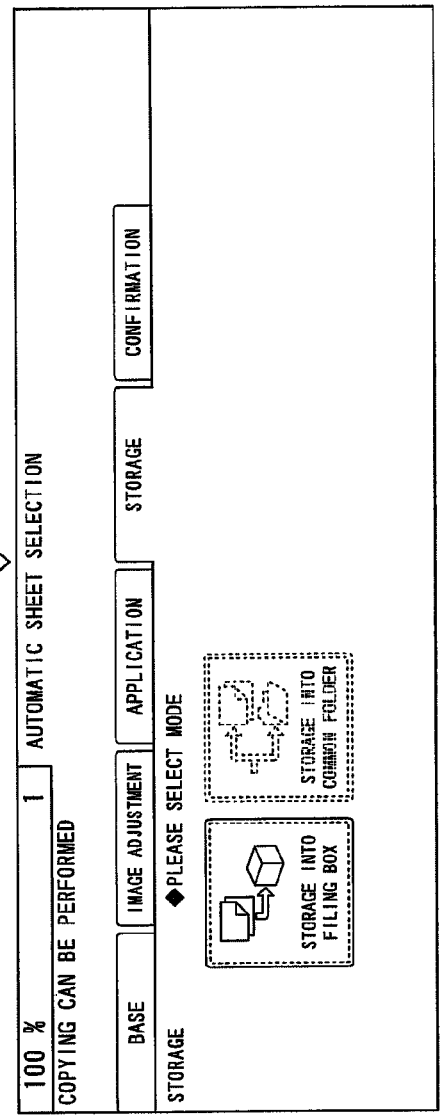
Figure 4L:
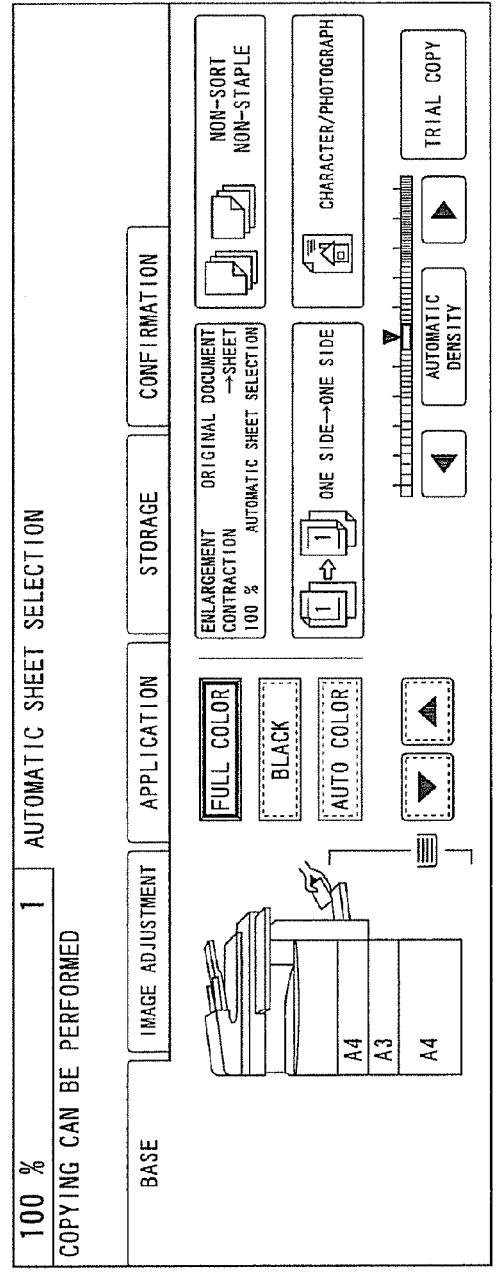

After the automatically created file name is confirmed, when the "setting" button is depressed, a transition is made to the screen of FIG. 4J, and when a "yes" button is further depressed, a transition is made to the screen of FIG. 4K.

Here, when the "start key" of the operation display unit 27 is depressed (step ST10), the copy of the original document is started, and at the same time, the image data file with the created file name is stored in the user box (in this example, the user box of "TEST02") of the HDD 24 (step ST11).

According to this embodiment, since the template is correlated with the user box and is created, when the user box is selected, the template is automatically selected (when plural templates are assigned to the same user box, the user selects from them), and the file name is automatically created based on the selected template, and therefore, the operation burden of the user relating to the creation of the file name becomes low.

Besides, in the related art, in the case where the file name is automatically created, since the file name is based on the sequence number and the date of year, month and day, in the case where a specific file is searched from many files, the identification is difficult, whereas according to this embodiment, the user name or the category name whose identification is easy can be included in the file name, and file search becomes easy.

(4) Storage Into the Common Storage Area

In the case of storage into the user box (user-specific storage area), the template is correlated with the user box and is created, however, in the case of storage into the common storage area, it is necessary to separately and independently create a template.

FIG. 6 shows a flowchart showing a procedure of template creation, which becomes substantially the same process as step ST4 and step ST5 of FIG. 3. That is, at step ST20, elements used for a file name are displayed on the operation display panel 41 to encourage the user to select an element. The screen displayed at this time is equivalent to that of FIG. 4F. Next, based on the element selected by the user, a template is created (step ST21). As stated above, at the storage into the common storage area, the template is previously created.

Figure 7:
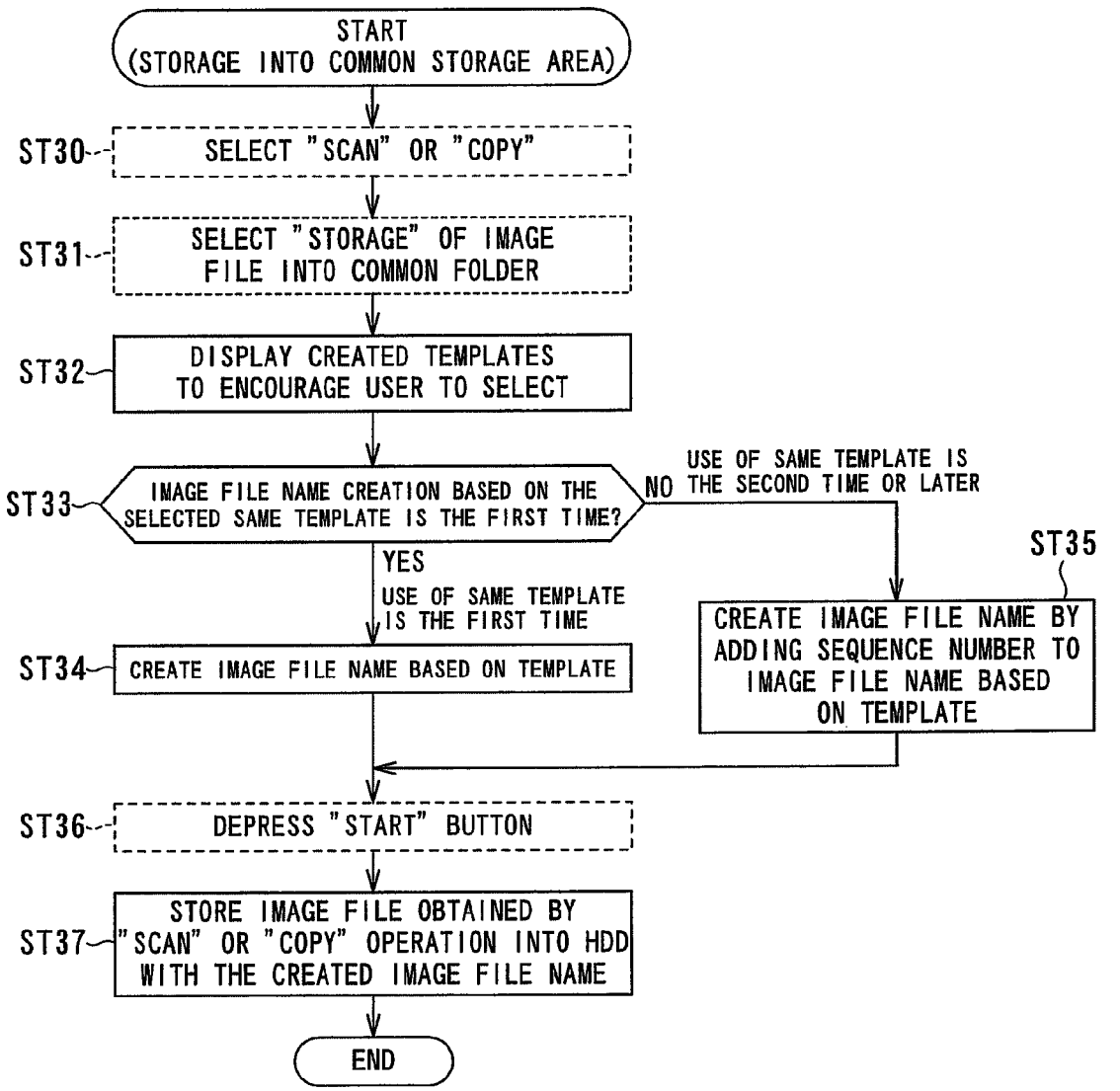
FIG. 7 is a flowchart showing an example of a process at the time when an image data file is stored in a common storage area of a storage unit.

FIG. 7 is a flowchart showing a process example of storage into the common storage area. Similarly to FIG. 3, a user's operation is indicated by a block of a broken line.

Besides, FIG. 8A to FIG. 8G are views showing display examples of the operation display panel 41 at the time of storage into the common storage area and its transition state.

The common storage area normally includes two kinds of areas, that is, an area called "common box" in a filing box and an area called "common folder".

The image data file stored in the "common box" in the filing box can be printed by using dedicated utility software, or plural image data files can be combined to create a new document.

On the other hand, an image data file is converted into a standard file format such as PDF, TIFF, or JPEG and is stored in the "common folder". The image data file stored in the "common folder" can be directly accessed from the external equipment 100 such as the personal computer.

The operation of file name automatic creation according to the embodiment is basically the same between the case of storage into the "common box" and the case of storage into the "common folder", and in the following description, the case of storage into the "common folder" is used as an example and a description will be made.

Figure 8A:
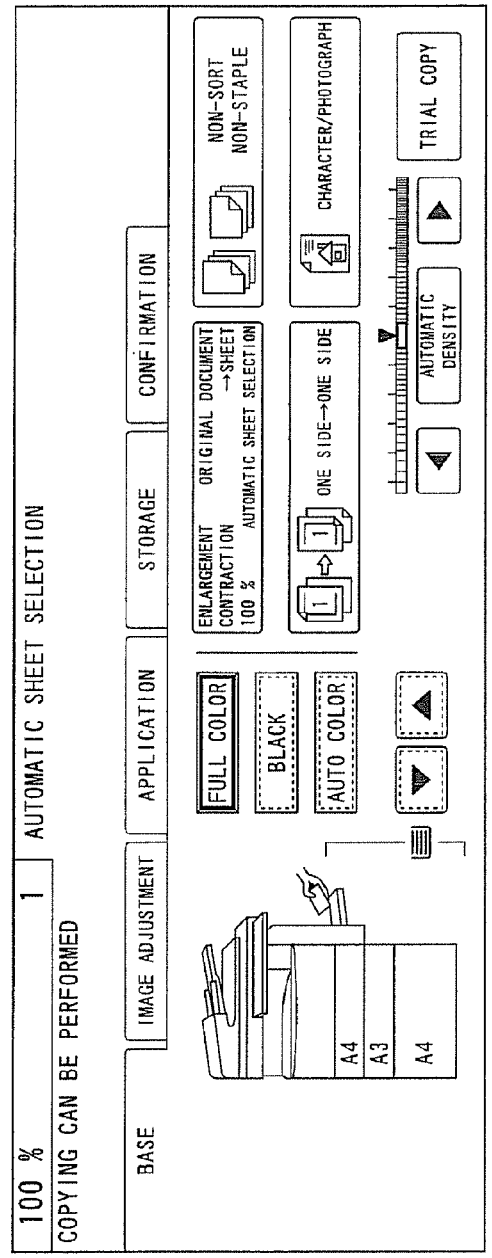
Figure 8B:
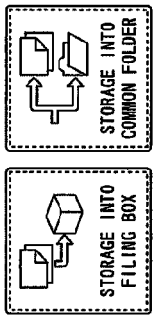

First, at step ST30 (FIG. 7), the scan function or the copy function is selected. In this example, the "copy" key 33 of the operation display unit 27 is depressed to select the copy function. By the depression of the "copy" key 33, the screen shown in FIG. 8A is displayed on the operation display panel 41.

Next, the selection operation for storing the image data file into the common folder is performed (step ST31). Specifically, the "storage" tag of the operation display panel 41 is depressed to make a transition to the display of FIG. 8B, and further, the "storage into common folder" button is depressed to make a transition to the screen of FIG. 8C.

Figure 8C:
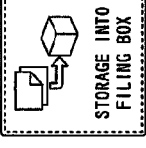

In FIG. 8C, previously created templates are displayed, and this display encourages the user to select a desired template (step ST32).

The user depresses the position of the desired template to select the template. A check mark "✓" is displayed in the selected template.

After the template is selected, when the "setting" button is depressed, it is next determined whether the creation of the file name based on the selected template is the first time (step ST33).

In the case where the creation of the file name using the same template is the first time, the file name is automatically created based on the selected template (step ST34), and the created file name is displayed on the screen. In this example, the same template as the template created in the user-specific storage area is created, and the file name is also the same "HINAGA: CONFIDENTIAL: 05-08-30".

On the other hand, in the case where the creation of the file name using the same template is the second time or later, the file name with the sequence number is automatically created (step ST35). This process is also similar to the file name creation in the user-specific storage area. The created file name "HINAGA: CONFIDENTIAL: 05-08-30:0002" is displayed on the display screen shown in FIG. 8E.

Figure 8F:
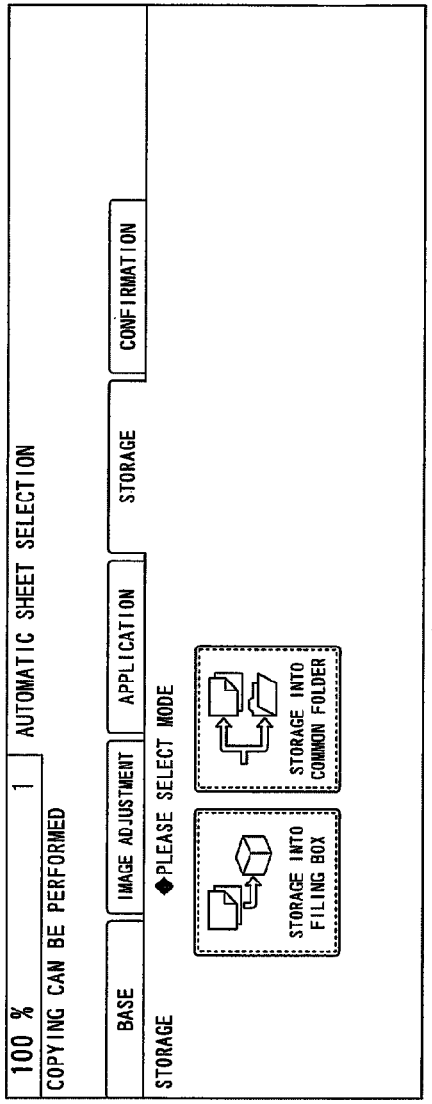

After confirming the automatically created file name, the user depresses the "setting" button, and a transition is made to the screen shown in FIG. 8F.

Figure 8G:
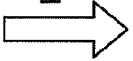
Figure 8G:
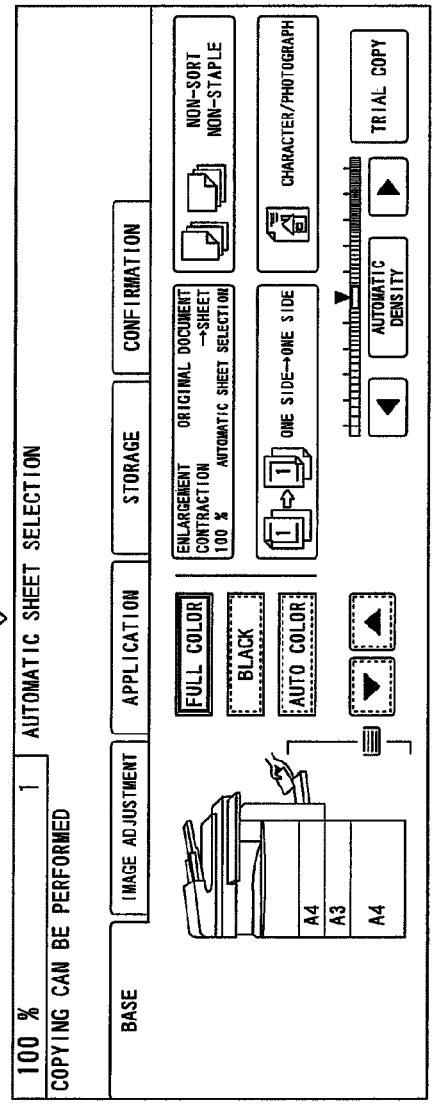

Here, when the "start" key of the operation display unit 27 is depressed, copying of the original document is started, and at the same time, the image data file with the automatically created file name is stored in the common storage area (in this example, "common folder") (step ST36, step ST37, FIG. 8G).

As stated above, even in the case of storage into the common storage area, by merely selecting the previously created template, the file name is automatically created based on the selected template, and therefore, the operation burden of the user relating to the file name creation becomes low.

Besides, similarly to the case of storage into the user-specific storage area, the user name or the category name whose identification is easy can be included in the file name, and the file search becomes easy.

(5) File Management

In this embodiment, the file name is automatically created based on the template. As a result, in addition to a mode of performing file management for each file as in the related art, plural files created based on a template can be collectively managed, for example, collectively deleted for each template.

Figure 9:
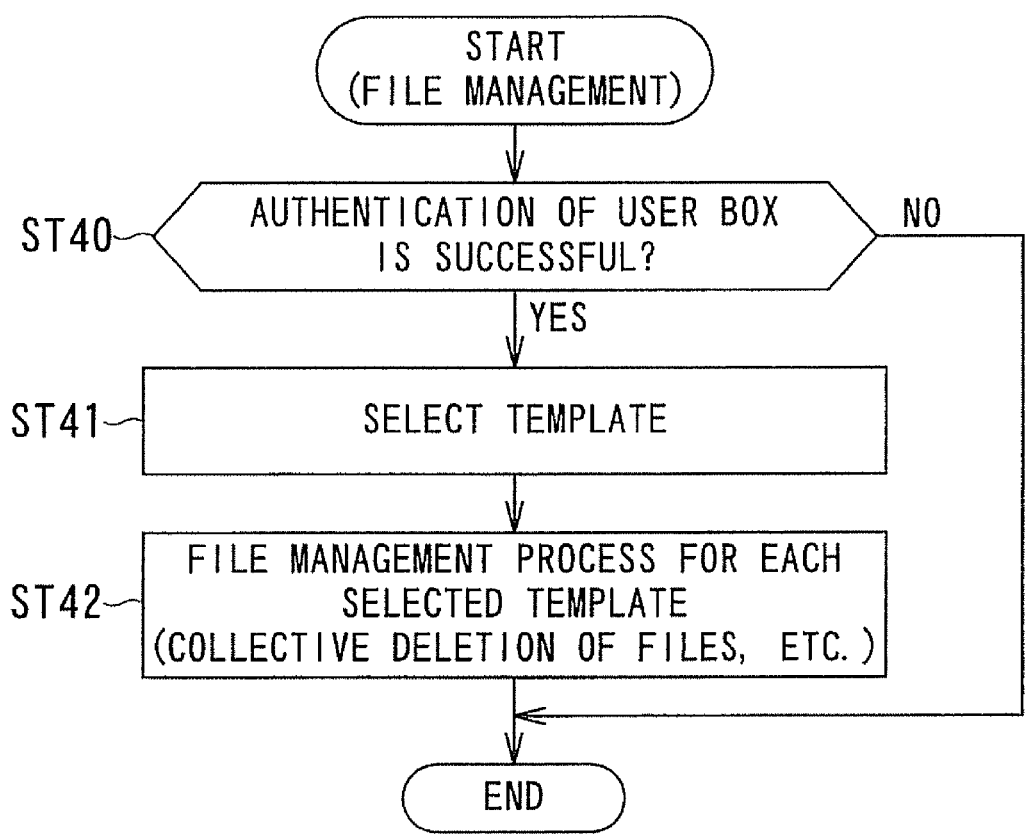
FIG. 9 is a flowchart showing an example of a file management process according to the embodiment.

FIG. 9 is a flowchart showing a process example of the case where files stored in the user box are collectively managed.

At step ST40, user authentication for accessing the user box is performed. This authentication is performed by, for example, inputting a password on the screen shown in FIG. 4D.

In the case where the authentication is successful, at step ST41, a template correlated with the user box is selected.

Thereafter, file management such as collective deletion is performed on plural files created based on the selected template (step ST42).

Since the capacity of the user box is finite, it is necessary to appropriately delete unnecessary files, however, in the related art, since only an access in file units can be performed, it takes much labor to delete files. On the other hand, in this embodiment, the file management can be performed in template units, and the efficiency of file management work such as file deletion can be improved.

As described above, according to the image forming apparatus 1, the image reading apparatus 2 and the control method thereof of the embodiment, when the file is stored, the file name whose operation burden is low and whose identification is easy can be created. Besides, the efficiency of the file management work is also improved.

Incidentally, the present invention is not limited to the embodiment described above, but can be embodied at the practical phase by modifying the components within the scope not departing from the gist. Besides, various embodiments of the inventions can be formed by suitable combinations of plural components disclosed in the embodiment. For example, some components may be deleted from all components described in the embodiment. Further, components in different embodiments may be suitably combined.

What is claimed is:

1. An image reading apparatus comprising:
    a user input receiving unit configured to receive at least one element selected among a plurality of elements by a user;
    a read unit configured to read an original document and to create an image file based on the original document;
    and a control unit configured
        to create a template for a folder in a storage based on the element,
        to create an image file name automatically based on the created template,
        to store an image file with the file name in a folder associated with a password, after the image file is created by the read unit and a password inputted by the user at the user input receiving unit is verified with the password associated with the folder,
        to receive a template selected by the user, and
        to collectively delete the image file whose name is created based on the selected template.

2. The image reading apparatus according to claim 1, wherein the elements constituting the template include at least one of a user identification name inputted by a user, a category name inputted by the user, information of a date of year, month and day when the image file is stored, and information of a time when the image file is stored.

3. The image reading apparatus according to claim 1, wherein when a different image file is stored based on the same template, the control unit creates an image file name by further adding a sequence number to an image file name created based on the template.

4. The image reading apparatus according to claim 1, wherein the control unit further creates plural templates which are correlated with one of plural storage areas in the storage.

5. The image reading apparatus according to claim 1, wherein plural storage areas in the storage include at least a common storage area which is owned by plural users in common and in which plural image files are stored, and plural user-specific storage areas which can be assigned to individual users and in which image files are stored by specifying their own area identification names.

6. The image reading apparatus according to claim 5,
wherein, in a case where the image file read by the read unit is stored in one of the plural storage areas, the control unit, after the storage areas are assigned by a user, displays the template correlated with the assigned storage areas on a display unit such that the user can select the template, and then creates the image file based on the template selected by the user.

7. The image reading apparatus according to claim 5, wherein,
the password is set for each of the plural user-specific storage areas.

8. A control method of an image reading apparatus, comprising:
receiving at least one element selected among a plurality of elements by a user at a user input receiving unit;
reading an original document and creating an image file based on the original document;
creating a template for a folder in a storage based on the element,
creating an image file name automatically based on the created template,
storing the image file with the file name in a folder associated with a password, after the image file is created by the read unit and a password inputted by the user at the user input receiving unit is verified with the password associated with the folder, by a control unit,
receiving a template selected by the user, and
collectively deleting the image file whose name is created based on the selected template.

9. The method according to claim 8, wherein the elements constituting the template include at least one of a user identification name inputted by a user, a category name inputted by the user, information of a date of year, month and day when the image file is stored, and information of a time when the image file is stored.

10. The method according to claim 8, wherein when a different image file is stored based on the same template, an image file name is created by further adding a sequence number to an image file name created based on the template.

11. The method according to claim 8, wherein plural templates are further created which are correlated with one of plural storage areas in the storage.

12. The method according to claim 8, wherein
plural storage areas in the storage include at least a common storage area which is owned by plural users in common and in which plural image files are stored, and plural user-specific storage areas which can be assigned to individual users and in which image files are stored by specifying their own area identification names.

13. The method according to claim 12, further comprising in a case where the image file read by the read unit is stored in one of the plural storage areas, after the storage areas are assigned by a user,
displaying the template correlated with the assigned storage areas on a display unit such that the user can select the template, and then
creating the image file name based on the template selected by the user.

14. The method according to claim 12, further comprising setting the password for each of the plural user-specific storage areas.

15. An image reading apparatus, comprising:
a user input receiving means for receiving at least one element selected among a plurality of elements by a user;
a read means for reading an original document and creating an image file based on the original document; and
a control means for
creating a template for a folder in a storage based on the element,
creating an image file name automatically based on the created template,
storing the image file with the file name in a folder associated with a password, after the image file is created by the read means and a password inputted by the user at the user input receiving mean is verified with the password associated with the folder,
receiving a template selected by the user, and
collectively deleting the image file whose name is created based on the selected template.

16. The image reading apparatus according to claim 15, wherein the elements constituting the template include at least one of a user identification name inputted by a user, a category name inputted by the user, information of a date of year, month and day when the image file is stored, and information of a time when the image file is stored.

17. The image reading apparatus according to claim 15, wherein when a different image file is stored based on the same template, the control means creates an image file name by further adding a sequence number to an image file name created based on the template.

18. The image reading apparatus according to claim 15, wherein control means further creates plural templates which are correlated with one of plural storage areas in the storage.

19. The image reading apparatus according to claim 15, wherein
plural storage areas in the storage include at least a common storage area which is owned by plural users in common and in which plural image files are stored, and plural user-specific storage areas which can be assigned to individual users and in which image files are stored by specifying their own area identification names.

20. The image reading apparatus according to claim 19, wherein
in a case where the image file read by the read means is stored in one of the plural storage areas, the control means, after the storage areas are assigned by a user, displays the template correlated with the assigned storage areas on a display unit such that the user can select the template, and then creates the image file name based on the template selected by the user.

* * * * *